US011379399B2

(12) United States Patent
Taye et al.

(10) Patent No.: US 11,379,399 B2
(45) Date of Patent: Jul. 5, 2022

(54) ROUTE DEMULTIPLEXED SIGNAL PAIRS

(71) Applicant: Hewlett-Packard Development Company, L.P., Spring, TX (US)

(72) Inventors: Mengistu Taye, Spring, TX (US); Evan Lu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/043,793

(22) PCT Filed: Jun. 5, 2018

(86) PCT No.: PCT/US2018/035965
§ 371 (c)(1),
(2) Date: Sep. 30, 2020

(87) PCT Pub. No.: WO2019/236057
PCT Pub. Date: Dec. 12, 2019

(65) Prior Publication Data
US 2021/0149832 A1    May 20, 2021

(51) Int. Cl.
*G06F 13/40* (2006.01)
*G06F 13/38* (2006.01)
*G06F 13/42* (2006.01)

(52) U.S. Cl.
CPC ........ *G06F 13/4022* (2013.01); *G06F 13/385* (2013.01); *G06F 13/409* (2013.01); *G06F 13/4221* (2013.01); *G06F 2213/0026* (2013.01)

(58) Field of Classification Search
CPC .. G06F 13/4022; G06F 13/385; G06F 13/409; G06F 13/4221; G06F 13/0026
See application file for complete search history.

(56) References Cited

U.S. PATENT DOCUMENTS

| 6,477,603 | B1 | 11/2002 | Locker et al. |
| 9,436,234 | B1 | 9/2016 | Felton et al. |
| 9,524,262 | B2 | 12/2016 | Wang |
| 2003/0101304 | A1* | 5/2003 | King ..................... G06F 13/409 710/301 |
| 2007/0067541 | A1* | 3/2007 | Chang ................... G06F 13/409 710/307 |
| 2012/0311215 | A1 | 12/2012 | Cong |
| 2014/0013017 | A1* | 1/2014 | DeCesaris ........... G06F 13/4282 710/105 |
| 2014/0223064 | A1 | 8/2014 | Wang |
| 2015/0074323 | A1* | 3/2015 | Chumbalkar ........... G06F 13/40 710/316 |

(Continued)

FOREIGN PATENT DOCUMENTS

EP          0832458        9/2006

*Primary Examiner* — Henry Tsai
*Assistant Examiner* — Aurangzeb Hassan
(74) *Attorney, Agent, or Firm* — Brooks Cameron & Huebsch PLLC

(57) ABSTRACT

Example implementations relate to route demultiplexed signal pairs. In some examples, a motherboard of a computing device can include a chipset, a first Peripheral Component Interconnect Express (PCIe) bus, a second PCIe bus, a riser slot, and a demultiplexer connected to the chipset to selectively route particular signal pairs from the chipset to at least one of the first PCIe bus, the second PCIe bus, and the riser slot based on whether a riser card is connected to the riser slot.

10 Claims, 3 Drawing Sheets

(56) References Cited

U.S. PATENT DOCUMENTS

2015/0347345 A1   12/2015  Hellriegel et al.
2016/0380694 A1   12/2016  Guduru
2017/0351640 A1*  12/2017  Nilange ............... G06F 13/4291
2018/0004695 A1*   1/2018  Chu ..................... G06F 3/0688

* cited by examiner

ROUTE DEMULTIPLEXED SIGNAL PAIRS

BACKGROUND

A computing device can include a motherboard. A computing device motherboard is a printed circuit board (PCB) that can allow communication between electronic components of the computing device. For example, a motherboard can allow for communication between a central processing unit (CPU), memory, and/or other components of the motherboard and/or other peripheral devices of the computing device. A motherboard may be housed in a computing device chassis.

DETAILED DESCRIPTION

Figure 1:
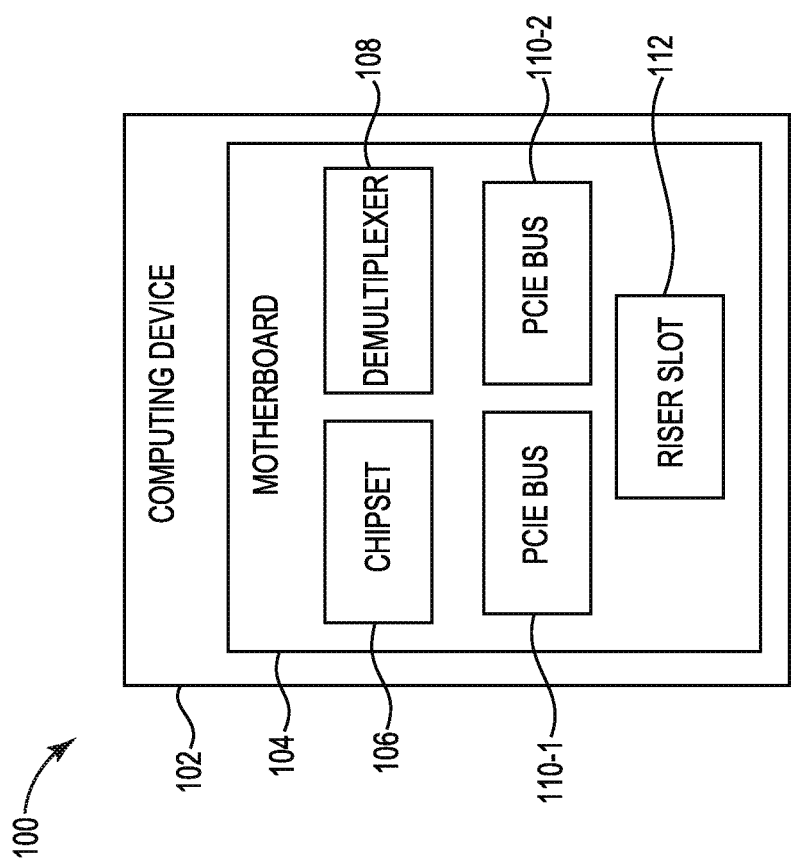
FIG. 1 is a diagram of an example system to route demultiplexed signal pairs consistent with the disclosure.

Some motherboards may include peripheral card slots. For example, a peripheral card slot can include a peripheral component interconnect express (PCIe) bus. As used herein, the term "PCIe bus" refers to a communication system that transfers data between components using a high-speed serial computer expansion bus standard. The PCIe bus can receive various types of expansion cards. As used herein, the term "expansion card" refers to a printed circuit board (PCB) that can be inserted into the PCIe bus to add functionality to a computing device. For example, an expansion card such as a sound card, video/graphics card, and/or networking card, among other types of expansion cards, may be inserted into a PCIe bus of the computing device to add the various corresponding functionalities (e.g., sound, video/graphics, and/or networking, such as wired or wireless networking) to the computing device.

As described above, a motherboard can be housed in a computing device chassis. As used herein, the term "computing device chassis" refers to an enclosure that includes components of a computing device. For example, the computing device chassis can house a power supply, hard drive(s), cooling systems, and/or the motherboard and corresponding motherboard components, among other types of components of the computing device.

Computing device chassis' can be manufactured in different sizes. For instance, some computing device chassis' may be manufactured to be smaller than other computing device chassis'. The size of a computing device chassis may be determined based on performance, aesthetics, location (e.g., where the computing device is to be located, such as on top of a desk, underneath a desk, etc.), and/or other considerations.

In some cases, the same motherboard may be used in differently sized computing device chassis'. For example, a manufacturer may use the same motherboard in differently sized computing device chassis' based on cost considerations, design complexity, customer specifications, etc.

In an example in which a motherboard is included in a larger computing device chassis, the motherboard may be able to utilize a higher number of peripheral card slots. However, the same motherboard in a smaller computing device chassis may be able to support less peripheral card slots due to size and/or space limitations within the smaller computing device chassis.

Route demultiplexed signal pairs according to the disclosure can selectively route signal pairs to various peripheral card slots. Selectively routing signal pairs to various peripheral card slots can allow for a larger number of peripheral card slots of the motherboard to be used when the motherboard is installed in a larger computing device chassis, and allow for a smaller number of peripheral card slots of the motherboard to be used when the motherboard is installed in a smaller computing device chassis. In other words, the same motherboard may be utilized in differently sized computing device chassis' without re-design of the motherboard for the differently sized computing device chassis'.

FIG. 1 is a diagram of an example system 100 to route demultiplexed signal pairs consistent with the disclosure. As illustrated in FIG. 1, system 100 can include computing device 102, motherboard 104, chipset 106, demultiplexer 108, PCIe bus 110-1, 110-2, and riser slot 112.

As illustrated in FIG. 1, computing device 102 can include motherboard 104. Motherboard 104 can include chipset 106. As used herein, the term "chipset" refers to a set of electronic components in an integrated circuit that manages data flow between a processor, memory, and peripherals of the computing device. For example, the chipset can manage data flow between various components of motherboard 104, such as between demultiplexer 108, PCIe buses 110-1 and 110-2, and riser slot 112.

As used herein, the term "riser slot" refers to a bus that transfers data between components using a high-speed serial computer expansion bus standard. The riser slot can receive a riser card. As used herein, the term "riser card" refers to a PCB that picks up a multitude of signal lines via the riser slot on the motherboard and distributes the multitude of signal lines to connectors on the riser card. In some examples, the riser card can pick up a multitude of signal lines and distribute them to a PCIe bus, or multiple PCIe buses, on the riser card.

For example, motherboard 104 may be utilized in computing device 102 having a computing device chassis which may be larger than other computing device cassis' that can utilize motherboard 104. In such an example, a riser card can be connected to riser slot 112, which may allow support for a higher number of PCIe buses relative to a computing device chassis which may be smaller and, as a result, have space restrictions such that PCIe bus 110-1 and PCIe bus 110-2 may be the PCIe buses that can be used.

In some examples, the riser card can include two PCIe x1 buses. For example, the riser card can include two PCIe buses having one data lane.

In some examples, the riser card can include one PCIe x4 bus. For example, the riser card can include one PCIe bus having four data lanes.

Although the riser card is described above as including two PCIe x1 buses or one PCIe x4 bus, examples of the disclosure are not so limited. For example, the riser card can include any other number of and/or combination of PCIe x1 and PCIe x4 buses. Further, in some examples, the riser card can include any number of and/or combination of PCIe x8, PCIe x16, and/or PCIe x32 buses, among other examples.

As described above, motherboard 104 can include PCIe bus 110-1, 110-2. In some examples, PCIe bus 110-1 can be a PCIe x2 bus. However, examples of the disclosure are not so limited. For example, PCIe bus 110-1 can include any other number of and/or combination of PCIe x1, PCIe x4, PCIe x8, PCIe x16, and/or PCIe x32 buses. Further, in some examples, PCIe bus 110-2 can be a PCIe x2 bus. However, examples of the disclosure are not so limited. For example, PCIe bus 110-2 can include any other number of and/or combination of PCIe x1, PCIe x4, PCIe x8, PCIe x16, and/or PCIe x32 buses.

As illustrated in FIG. 1, motherboard 104 can include demultiplexer 108. As used herein, the term "demultiplexer" refers to a device to receive an input signal and switch the input signal to one of several output signals based on a control signal, such as a select signal.

For example, demultiplexer 108 can be connected to chipset 106, PCIe bus 110-1, 110-2, and riser slot 112. Demultiplexer 108 can selectively route signal pairs from chipset 106 to PCIe bus 110-1, 110-2 based on whether a riser card is connected to riser slot 112. As used herein, the term "signal pair" refers to an electrical signal sent as a differential pair of signals, each in its own conductor, such as traces on a circuit board. For example, demultiplexer 108 can selectively route signal pairs from chipset 106 to PCIe bus 110-1, 110-2, and riser slot 112 based on whether a riser card is connected to riser slot 112, as is further described in connection with FIGS. 2 and 3.

Figure 2:
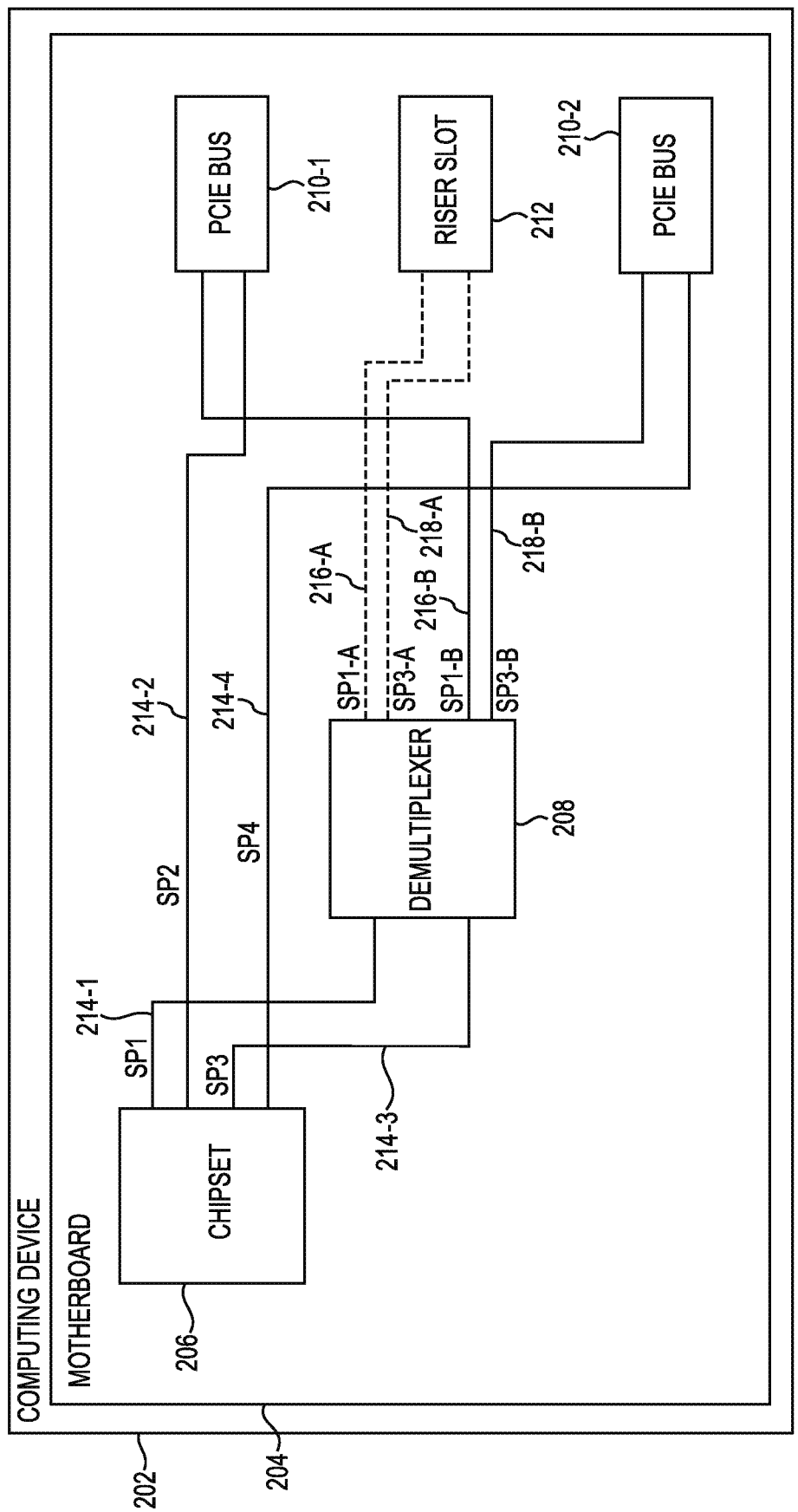
FIG. 2 is a diagram of an example computing device to route demultiplexed signal pairs consistent with the disclosure.

FIG. 2 is a diagram of an example computing device 202 to route demultiplexed signal pairs consistent with the disclosure. As illustrated in FIG. 2, computing device 202 can include motherboard 204. Motherboard 204 can include chipset 206, demultiplexer 208, PCIe bus 210-1, 210-2, and riser slot 212.

Chipset 206 can generate a first signal pair 214-1 (illustrated in FIG. 2 as "SP1"), a second signal pair 214-2 (illustrated in FIG. 2 as "SP2"), a third signal pair 214-3 (illustrated in FIG. 2 as "SP3"), and a fourth signal pair 214-4 (illustrated in FIG. 2 as "SP4"). The signal pairs 214-1, 214-2, 214-3, 214-4 can be directed to various components of motherboard 204, as is further described herein.

PCIe bus 210-1 can receive the second signal pair 214-2 (e.g., SP2) from chipset 206. For example, signal pair 214-2 can be transmitted via traces on motherboard 204 from chipset 206 to PCIe bus 210-1.

PCIe bus 210-2 can receive the fourth signal pair 214-4 (e.g., SP4) from chipset 206. For example, signal pair 214-4 can be transmitted via traces on motherboard 204 from chipset 206 to PCIe bus 210-2.

Demultiplexer 208 can receive the first signal pair 214-1 (e.g., SP1) from chipset 206. For example, signal pair 214-1 can be transmitted via traces on motherboard 204 from chipset 206 to demultiplexer 208. Additionally, demultiplexer 208 can receive the third signal pair 214-3 (e.g., SP3) from chipset 206. For example, signal pair 214-3 can be transmitted via traces on motherboard 204 from chipset 206 to demultiplexer 208.

Demultiplexer 208 can selectively route demultiplexed signal pairs of first signal pair 214-1 and third signal pair 214-3 to PCIe bus 210-1, PCIe bus 210-2, and the riser slot 212 based on whether a riser card is connected to the riser slot 212. Demultiplexer 208 can determine whether a riser card is connected to the riser slot 212 based on a select signal, as is further described herein.

As used herein, the term "select signal" refers to a signal received by demultiplexer 208 that determines which output signal to switch an input signal to. For example, a select signal can determine whether to route first demultiplexed signal pair 216-A of first signal pair 214-1 and first demultiplexed signal pair 218-A of third signal pair 214-3 to riser slot 212, as is further described herein. The select signal can be a low select signal or a high select signal.

Demultiplexer 208 can receive a low select signal from riser slot 212. In response to the received low select signal, demultiplexer 208 can determine that a riser card is connected to riser slot 212. For example, motherboard 204 may be utilized in a computing device chassis that can include space to utilize a riser card connected to riser slot 212. For instance, the riser card may include additional PCIe buses. Additional PCIe peripheral devices can be connected to PCIe buses on the riser card as a result of the available space in the larger computing device chassis.

Demultiplexer 208 can demultiplex the first signal pair 214-1 (SP1) and the third signal pair 214-3 (SP3). For example, demultiplexer 208 can demultiplex the first signal pair 214-1 to result in first demultiplexed signal pair 216-A (of first signal pair 214-1), (illustrated in FIG. 2 as "SP1-A"), and second demultiplexed signal pair 216-B (of first signal pair 214-1), (illustrated in FIG. 2 as "SP1-B"). Additionally, demultiplexer 208 can demultiplex the third signal pair 214-3 to result in first demultiplexed signal pair 218-A (of third signal pair 214-3), (illustrated in FIG. 2 as "SP3-A"), and second demultiplexed signal pair 218-B (of third signal pair 214-3), (illustrated in FIG. 2 as "SP3-B"). The demultiplexer can selectively route, in response to the riser card being connected to riser slot 212, the particular demultiplexed signal pairs of first signal pair 214-1 (e.g., first demultiplexed signal pair 216-A and second demultiplexed signal pair 216-B) and the particular demultiplexed signal pairs of third signal pair 214-3 (e.g., first demultiplexed signal pair 218-A and second demultiplexed signal pair 218-B) to first PCIe bus 210-1, second PCIe bus 210-2, and riser slot 212, as is further described herein.

For example, demultiplexer 208 can route, in response to the riser card being connected to riser slot 212, first demultiplexed signal pair 216-A (SP1-A) and first demultiplexed signal pair 218-A (SP3-A) to riser slot 212. Additionally, demultiplexer 208 can route, in response to the riser card being connected to riser slot 212, second demultiplexed signal pair 216-B (SP1-B) to PCIe bus 210-1. Further, demultiplexer 208 can route, in response to the riser card being connected to riser slot 212, second demultiplexed signal pair 218-B (SP3-B) to PCIe bus 210-2.

In other words, as a result of the riser card being connected to riser slot 212, PCIe bus 210-1 can receive demultiplexed signal pair 216-B (SP1-B) from demultiplexer 208 and signal pair 214-2 (SP2) from chipset 206. Riser slot 212 can receive first demultiplexed signal pair 216-1 (SP1-A) and first demultiplexed signal pair 218-1 (SP3-A) from demultiplexer 208. PCIe bus 210-2 can receive demultiplexed signal pair 218-B (SP3-B) from demultiplexer 208 and signal pair 214-4 (SP4) from chipset 206.

Demultiplexer 208 can receive a high select signal from riser slot 212. In response to the received high select signal, demultiplexer 208 can determine that a riser card is disconnected to riser slot 212. That is, demultiplexer 208 can determine that there is not a riser card connected to riser slot 212. For example, motherboard 204 may be utilized in a smaller computing device chassis and as a result, may not be able to utilize a riser card due to space restrictions.

Similar to the example in which a riser card is connected to riser slot 212, demultiplexer 208 can demultiplex the first signal pair 214-1 (SP1) and the third signal pair 214-3 (SP3). For example, demultiplexer 208 can demultiplex the first signal pair 214-1 to result in first demultiplexed signal pair 216-A (of first signal pair 214-1), (SP1-A), and second demultiplexed signal pair 216-B (of first signal pair 214-1), (SP1-B). Additionally, demultiplexer 208 can demultiplex the third signal pair 214-3 to result in first demultiplexed signal pair 218-A (of third signal pair 214-3), (SP3-A), and second demultiplexed signal pair 218-B (of third signal pair 214-3), (SP3-B). The demultiplexer can selectively route, in response to the riser card being disconnected from riser slot 212, particular demultiplexed signal pairs of first signal pair 214-1 (e.g., second demultiplexed signal pair 216-B) and particular demultiplexed signal pairs of third signal pair 214-3 (e.g., second demultiplexed signal pair 218-B) to first PCIe bus 210-1 and second PCIe bus 210-2, as is further described herein.

For example, demultiplexer 208 can route, in response to the riser card being disconnected from riser slot 212, second demultiplexed signal pair 216-B (SP1-B) to PCIe bus 210-1. Further, demultiplexer 208 can route, in response to the riser card being disconnected from riser slot 212, second demultiplexed signal pair 218-B (SP3-B) to PCIe bus 210-2.

In other words, as a result of the riser card being disconnected from riser slot 212, PCIe bus 210-1 can receive demultiplexed signal pair 216-B (SP1-B) from demultiplexer 208 and signal pair 214-2 (SP2) from chipset 206. PCIe bus 210-2 can receive demultiplexed signal pair 218-B (SP3-B) from demultiplexer 208 and signal pair 214-4 (SP4) from chipset 206.

As described above, the signal pairs routed to PCIe bus 210-1, 210-2, and/or riser slot 212 can depend on whether a riser card is connected to riser slot 212. Based on whether the riser card is connected to riser slot 212, demultiplexer 208 can receive a particular select signal (e.g., high or low). The routing scheme described above can be summarized by Table 1, below.

TABLE 1

Signal Routing Table

| Select Signal | PCIe Bus 210-1 Signal Pairs SP1-B and SP2 | Riser Slot Signal Pairs SP1-A and SP3-A | PCIe Bus 210-1 Signal Pairs SP3-B and SP4 |
|---|---|---|---|
| High | Enabled | Disabled | Enabled |
| Low | Disabled | Enabled | Disabled |

Although motherboard 204 is described herein and illustrated in FIG. 2 as including two PCIe buses 110 and one riser slot 112, examples of the disclosure are not so limited. For example, motherboard 204 can include more than two PCIe buses (e.g., four PCIe buses) and more than one riser slot (e.g., two riser slots), or any other number of/combination of PCIe buses and riser slots.

Route demultiplexed signal pairs can allow for a motherboard to be utilized in differently sized computing chassis'. For example, a computing device chassis that is smaller may include space restrictions inside the computing device chassis such that a riser card/riser slot may not be able to be utilized. A computing device chassis that is larger may not have space restrictions and as such, the riser card/riser slot may be utilized so that the computing device can include more peripheral card slots/peripheral cards than the computing device chassis that is smaller. In both instances, the same motherboard can be utilized, avoiding having to design different motherboards for differently sized computing device chassis'.

Figure 3:
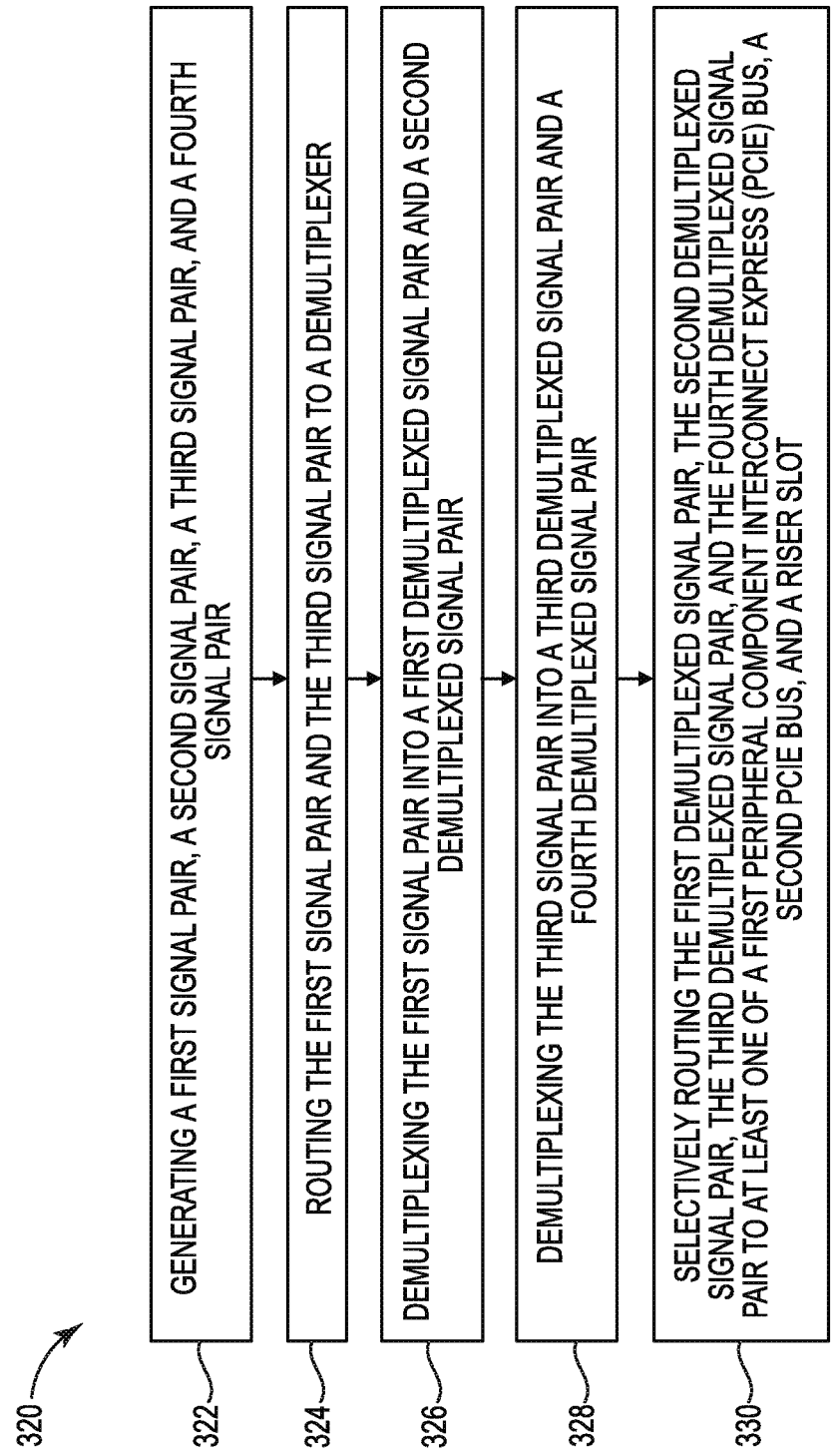
FIG. 3 is an example of a method to route demultiplexed signal pairs consistent with the disclosure.

FIG. 3 is an example of a method 320 to route demultiplexed signal pairs consistent with the disclosure. At 322, the method 320 includes generating a first signal pair, a second signal pair, a third signal pair, and a fourth signal pair. The first signal pair, the second signal pair, the third signal pair, and the fourth signal pair can be generated by a chipset of a motherboard.

At 324, the method 320 includes routing the first signal pair and the third signal pair to a demultiplexer. For example, the chipset can route the first signal pair and the third signal pair to the demultiplexer.

The method 320 can include routing the second signal pair to a first PCIe bus. For example, the chipset can route the second signal pair to the first PCIe bus.

The method 320 can include routing the fourth signal pair to a second PCIe bus. For example, the chipset can route the fourth signal pair to the second PCIe bus.

At 326, the method 320 includes demultiplexing the first signal pair. For example, the demultiplexer can demultiplex the first signal pair into a first demultiplexed signal pair (e.g., signal pair 216-A, previously described in connection with and illustrated as SP1-A in FIG. 2) and a second demultiplexed signal pair (e.g., signal pair 216-B, previously described in connection with and illustrated as SP1-B in FIG. 2).

At 328, the method 320 includes demultiplexing the third signal pair. For example, the demultiplexer can demultiplex the third signal pair into a third demultiplexed signal pair (e.g., signal pair 218-A, previously described in connection with and illustrated as SP3-A in FIG. 2) and a fourth demultiplexed signal pair (e.g., signal pair 218-B, previously described in connection with and illustrated as SP3-B in FIG. 2).

At 330, the method 320 includes selectively routing the first demultiplexed signal pair, the second demultiplexed signal pair, the third demultiplexed signal pair, and the fourth demultiplexed signal pair to the first PCIe bus, the second PCIe bus, and/or a riser slot of the motherboard. The demultiplexer can selectively route the first demultiplexed signal pair, the second demultiplexed signal pair, the third demultiplexed signal pair, and the fourth demultiplexed signal pair to the first PCIe bus, the second PCIe bus, and/or the riser slot based on a select signal received by the demultiplexer from the riser slot. For example, the riser slot can send a high select signal to the demultiplexer in response to a riser card being connected to the riser slot, and a low select signal to the demultiplexer in response to a riser card being disconnected from the riser slot (e.g., no riser card is connected to the riser slot).

In response to the demultiplexer receiving a high select signal from the riser slot (e.g., a riser card is connected to the riser slot), the method 320 can include routing, by the demultiplexer, the first demultiplexed signal pair (e.g., SP1-A as illustrated in FIG. 2) and the third demultiplexed signal pair (e.g., SP3-A as illustrated in FIG. 2) to the riser slot. Additionally, the demultiplexer can route the second demultiplexed signal pair (e.g., SP1-B as illustrated in FIG. 2) to the first PCIe bus (e.g., PCIe bus 210-1, as previously described in connection with FIG. 2). Further, the demultiplexer can route the fourth demultiplexed signal pair (e.g., SP3-B) to the second PCIe bus (e.g., PCIe bus 210-2, as previously described in connection with FIG. 2).

In response to the demultiplexer receiving a low select signal from the riser slot (e.g., a riser card is disconnected from the riser slot), the method 320 can include routing, by the demultiplexer, the second demultiplexed signal pair (e.g., SP1-B as illustrated in FIG. 2) to the first PCIe bus (e.g., PCIe bus 210-1, as previously described in connection with FIG. 2). Further, the demultiplexer can route the fourth demultiplexed signal pair (e.g., SP3-B) to the second PCIe bus (e.g., PCIe bus 210-2, as previously described in connection with FIG. 2).

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

Elements illustrated in the various figures herein can be added, exchanged, and/or eliminated so as to provide a plurality of additional examples of the disclosure. In addition, the proportion and the relative scale of the elements provided in the figures are intended to illustrate the examples of the disclosure, and should not be taken in a limiting sense. As used herein, "a plurality of" an element and/or feature can refer to more than one of such elements and/or features.

What is claimed:

1. A motherboard of a computing device, comprising:
a first Peripheral Component Interconnect Express (PCIe) bus;
a second PCIe bus;
a riser slot;
a chipset to route:
    a first signal pair to a demultiplexer;
    a second signal pair directly to the first PCIe bus;
    a third signal pair to the demultiplexer; and
    a fourth signal pair directly to the second PCIe bus; and
the demultiplexer connected to the chipset to selectively route, based on a riser card being connected to the riser slot:
    a first demultiplexed signal pair of the first signal pair to the riser slot;
    a first demultiplexed signal pair of the third signal pair to the riser slot;
    a second demultiplexed signal pair of the first signal pair to the first PCIe bus; and
    a second demultiplexed signal pair of the third signal pair to the second PCIe bus.

2. The motherboard of claim 1, wherein the demultiplexer is to selectively route a first signal pair from the chipset and a third signal pair from the chipset.

3. The motherboard of claim 1, wherein the demultiplexer is to demultiplex the first signal pair to generate the first demultiplexed signal pair of the first signal pair and the second demultiplexed signal pair of the first signal pair and the third signal pair to generate the first demultiplexed signal pair of the third signal pair and the second demultiplexed signal pair of the third signal pair.

4. The motherboard of claim 1, wherein the demultiplexer is to:
demultiplex the first signal pair and the third signal pair; and
selectively route, in response to the riser card being disconnected from the riser slot, particular demultiplexed signal pairs to the first PCIe bus and the second PCIe bus, wherein each of the demultiplexed signal pairs correspond to a respective signal pair from the chipset.

5. A motherboard of a computing device, comprising:
a chipset to generate and route a first signal pair, a second signal pair, a third signal pair, and a fourth signal pair;
a first Peripheral Component Interconnect Express (PCIe) bus to receive the second signal pair directly from the chipset;
a second PCIe bus to receive the fourth signal pair directly from the chipset;
a riser slot; and
a demultiplexer connected to the chipset to selectively route, based on a riser card being connected to the riser slot:
    a first demultiplexed signal pair of the first signal pair to the riser slot;
    a first demultiplexed signal pair of the third signal pair to the riser slot;
    a second demultiplexed signal pair of the first signal pair to the first PCIe bus; and
    a second demultiplexed signal pair of the third signal pair to the second PCIe bus.

6. The motherboard of claim 5, wherein, in response to the riser card being disconnected from the riser slot, the demultiplexer is to:
route the second demultiplexed signal pair of the first signal pair to the first PCIe bus; and
route the second demultiplexed signal pair of the third signal pair to the second PCIe bus.

7. The motherboard of claim 5, wherein the demultiplexer is to determine:
the riser card is connected to the riser slot in response to a low select signal being received by the demultiplexer from the riser slot; and
the riser card is disconnected from the riser slot in response to a high select signal being received by the demultiplexer from the riser slot.

8. A method, comprising:
generating, by a chipset of a motherboard, a first signal pair, a second signal pair, a third signal pair, and a fourth signal pair;
routing, by the chipset:
    the first signal pair and the third signal pair to a demultiplexer; and
    the second signal pair directly to a first Peripheral Component Interconnect Express (PCIe) bus; and
    the fourth signal pair directly to a second PCIe bus;
demultiplexing, by the demultiplexer:
    the first signal pair into a first demultiplexed signal pair and a second demultiplexed signal pair of the first signal pair; and
    the third signal pair into a first demultiplexed signal pair and a second demultiplexed signal pair of the third signal pair;
selectively routing, by the demultiplexer in response to a select signal received by the demultiplexer from the riser slot indicating that a riser card is connected to the riser slot:
    the first demultiplexed signal pair of the first signal pair to the riser slot;
    the first demultiplexed signal pair of the third signal pair to the riser slot;

the second demultiplexed signal pair of the first signal pair to the first PCIe bus; and the second demultiplexed signal pair of the third signal pair to the second PCIe bus.

9. The method of claim 8, wherein the method includes routing, by the demultiplexer in response to receiving a high select signal from the riser slot:

the first demultiplexed signal pair of the first signal pair to the riser slot;

the first demultiplexed signal pair of the third signal pair to the riser slot;

the second demultiplexed signal pair of the first signal pair to the first PCIe bus; and the second demultiplexed signal pair of the third signal pair to the second PCIe bus;

wherein the high select signal corresponds to the riser card being connected to the riser slot.

10. The method of claim 8, wherein the method includes routing, by the demultiplexer in response to receiving a low select signal from the riser slot:

the second demultiplexed signal pair of the first signal pair to the first PCIe bus; and the second demultiplexed signal pair of the third signal pair to the second PCIe bus;

wherein the low select signal corresponds to the riser card being disconnected from the riser slot.

\* \* \* \* \*